Patented Nov. 14, 1950

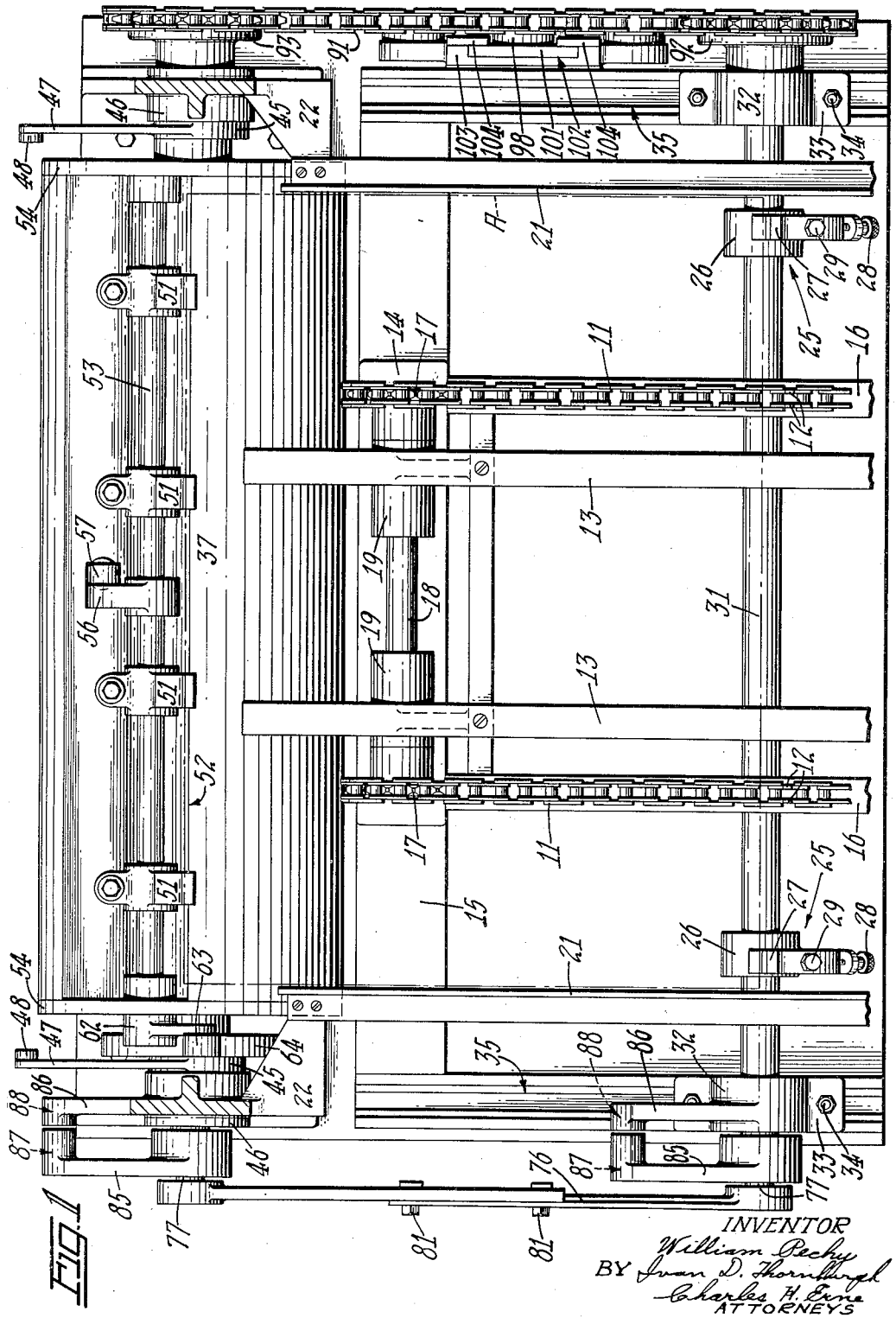

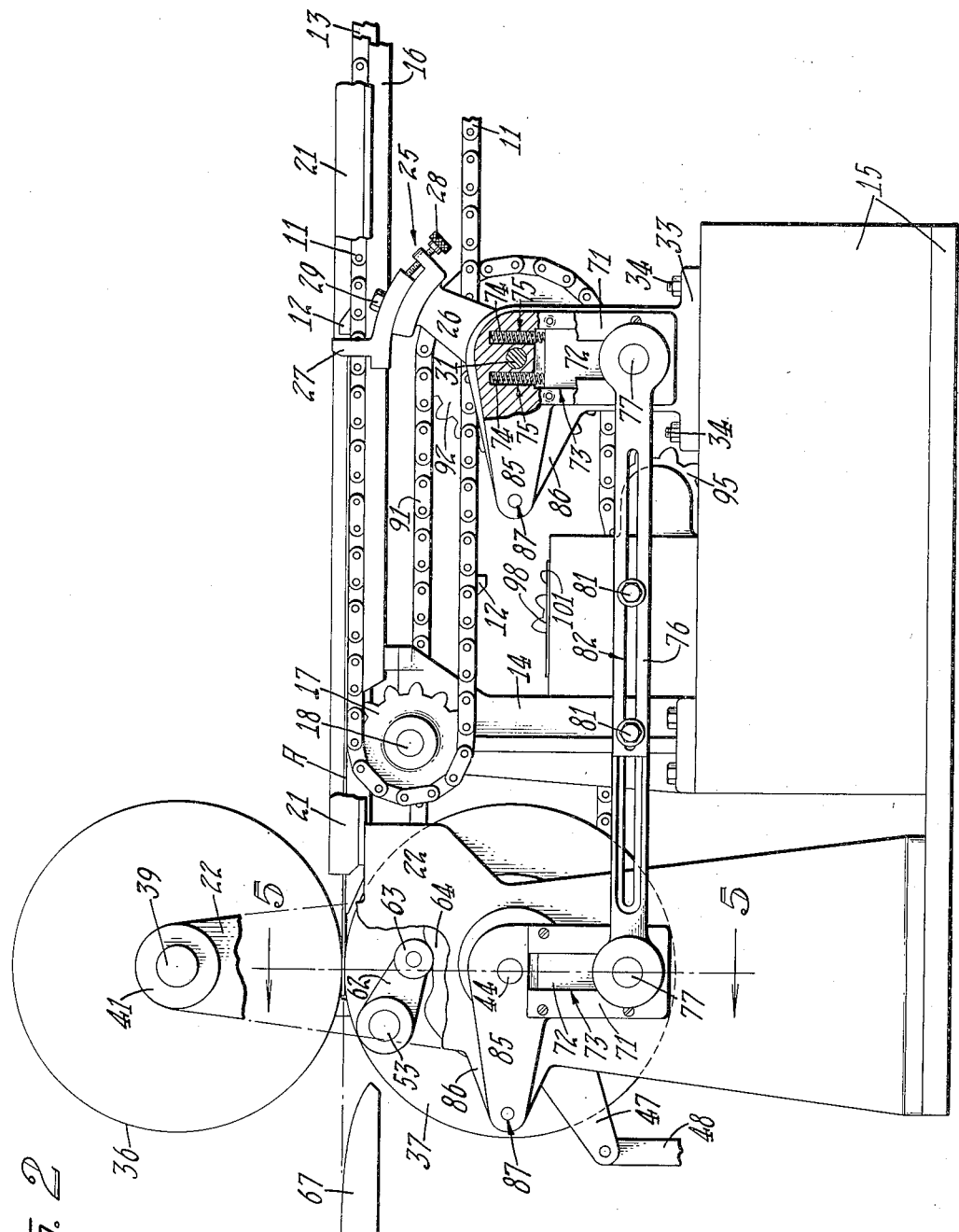

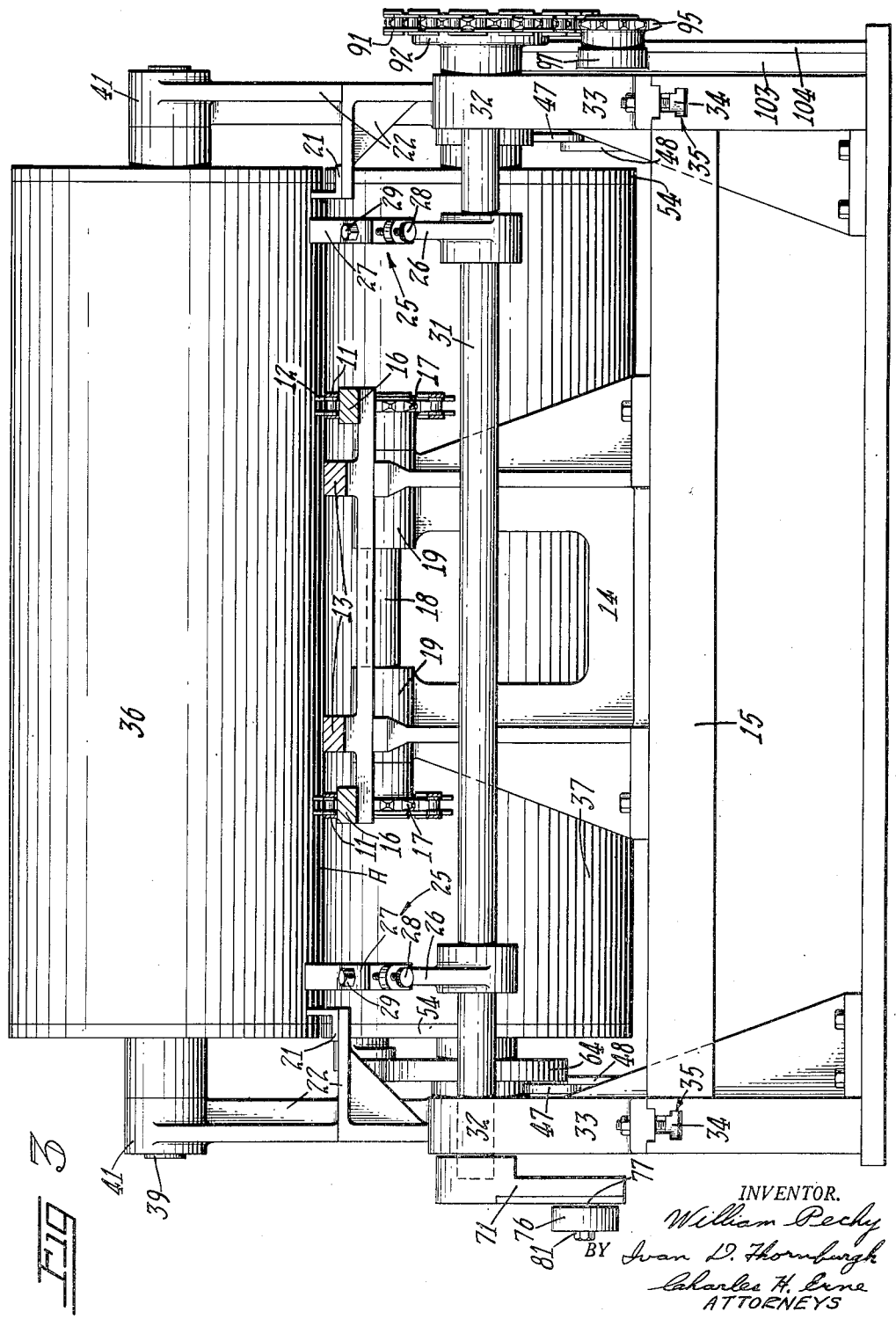

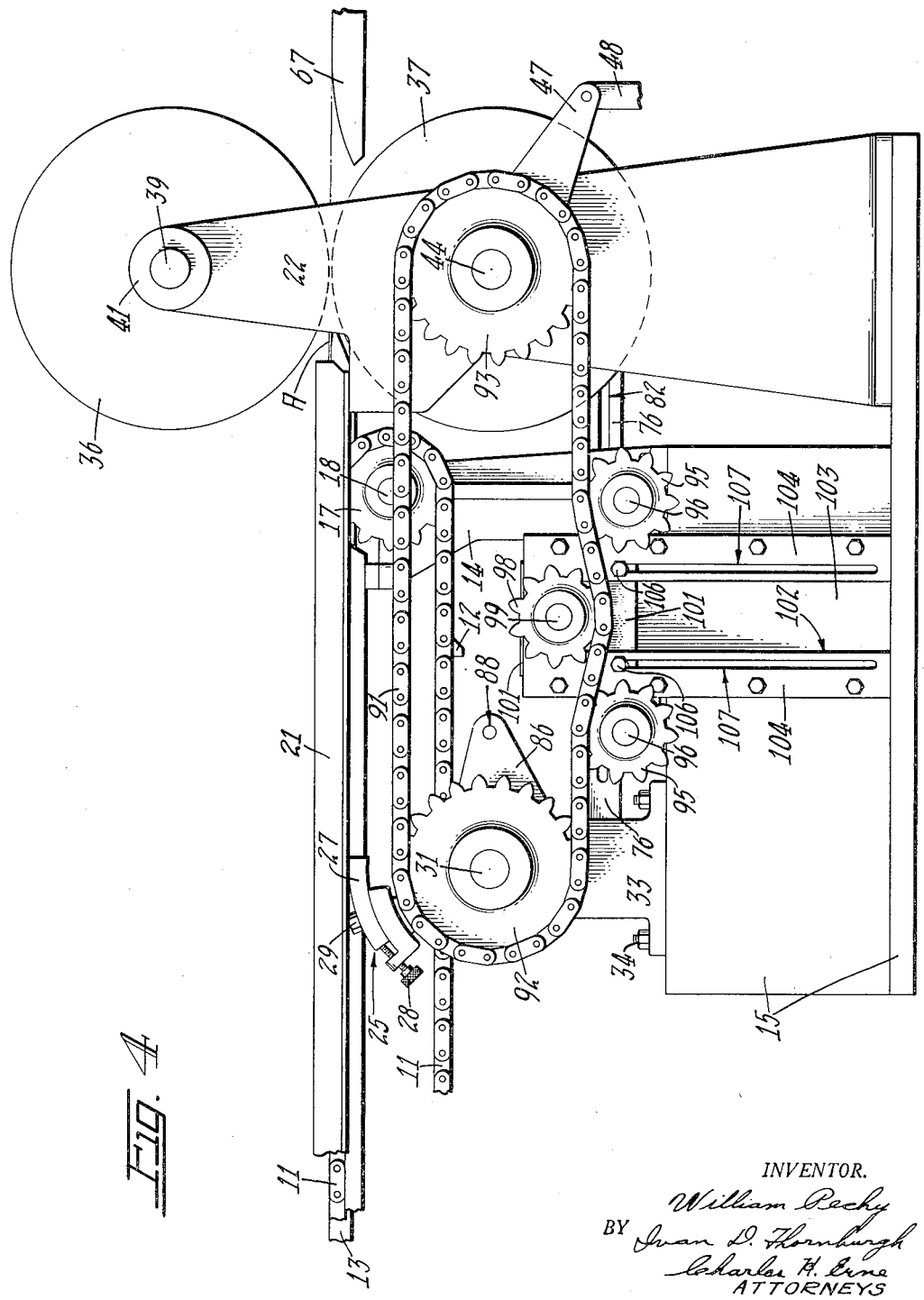

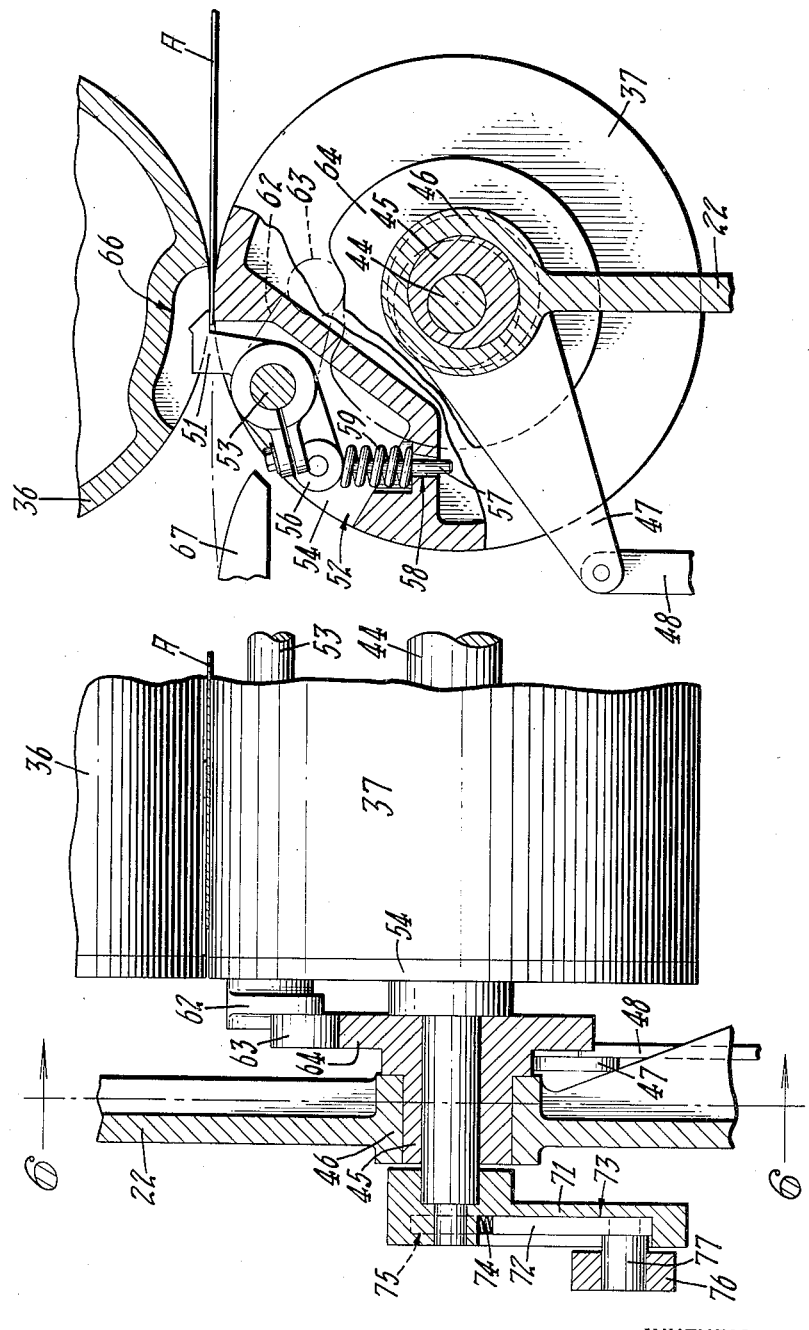

2,529,513

UNITED STATES PATENT OFFICE 2,529,513

GAUGE DRIVING DEVICE FOR SHEET FEEDING AND GAUGING MECHANISMS

William Pechy, Manasquan, N. J., assignor to American Can Company, New York, N. Y., a corporation of New Jersey Application October 26, 1948, Serial No. 56,618

10 Claims. (Cl. 271—8)

The present invention relates to a sheet feeding and gauging mechanism in which sheet material is required to be located in an accurate predetermined position for proper treatment and has particular reference to gauge driving devices which operate without lost motion to insure accurate registry of the sheet material.

In the feeding of sheet material through machines such as printing presses and coating machines where an impression is applied to the sheet material in predetermined positions and in cutting or other machines where an operation or a series of operations are performed on predetermined portions of the sheet material, it is important to accurately square up the material with reference to one or more edge or edges so that the impressions or operations on the material will be received or effected in definite locations on the sheet material.

In some cases this squaring up of the material has been effected relative to its front or leading edge. Although this method of front gauging has been used extensively with a large degree of success, it has been found that in machines using gripper and gauging devices which operate at high speeds, the gauging and gripping time is so short that the material often is not properly gauged before it is gripped and advanced through the machine. This results in imperfect work and sometimes causes considerable damage to the material.

A more accurate and more positive method of gauging the material has been found in effecting the gauging operation relative to its back or feeding edge. However where such gauging is used, especially when the front edge of the material must be gripped for further advancement, the point of gauging along the back edge bears a definite lineal relation to the point of gripping along the front edge, and any lost motion in the travel or operation of the back gauges seriously impairs the accuracy in properly locating the material.

The instant invention contemplates overcoming these difficulties by providing a driving means for a back gauge which eliminates any lost motion.

An object of the invention is the provision in a sheet feeding and gauging mechanism of gauge driving devices wherein all lost motion or play in the moving parts of the gauge and its driving devices are eliminated so as to insure accuracy of operation of the gauge in locating the sheet material to be operated upon.

Another object is the provision of such a feeding and gauging mechanism wherein the gauging portion of the mechanism is driven by and in time with the gripper or feeding portion of the mechanism, through a rigid connection, so that a definite lineal or spaced relation between these elements is provided for insuring accurate locating of the sheet material immediately prior to gripping the material for advancement through the machine.

Another object is the provision of such a feeding and gauging mechanism wherein the rigid gauge driving device may be adjusted to accommodate the back gauge to sheet material of different lengths.

Another object is the provision of such a feeding and gauging mechanism wherein a definite and accurate relation between the back gauge and the gripper devices may be maintained while adjusting the driving connection between them so as to insure accuracy of operation of the gauge.

Another object is the provision of such a feeding and gauging mechanism wherein the gauge driving device is mounted in such a manner as to permit flexibility of operation so that under abnormal conditions a yielding action may be had without impairing the gauging relation between the back gauge and the gripper devices.

Another object is the provision of such a feeding and gauging mechanism wherein the rigid driving connection between the back gauge and the gripper devices is prevented from locking itself so that continuous and accurate operation of the mechanism is insured.

Numerous other objects and advantages of the invention will be apparent as it is better understood from the following description, which, taken in connection with the accompanying drawings, discloses a preferred embodiment thereof.

Referring to the drawings:

Figure 1 is a top plan view of the feed table and associated parts of a feeding and gauging mechanism embodying the instant invention, with parts broken away and parts above the table omitted;

Fig. 2 is a side elevation of the mechanism shown in Fig. 1 as viewed from the left in that figure, with parts broken away and parts shown in section;

Fig. 3 is a front elevation of the mechanism illustrated in Fig. 1, with parts broken away;

Fig. 4 is a side elevation of the mechanism as viewed from the right in Fig. 1, with parts broken away;

Fig. 5 is an enlarged sectional detail taken subsubstantially along the vertical line 5—5 in Fig. 2, with parts broken away; and Fig. 6 is a sectional view taken substantially along the vertical line 6—6 in Fig. 5, with parts broken away.

As a preferred and exemplary embodiment of the invention the drawings illustrate principal parts of a sheet feeding and gauging mechanism for feeding and gauging sheets A (Figs. 2 and 3) of tin plate or the like sheet material and for advancing them into a sheet treating machine such as a printing machine, scroll shear, slitter or other machine used for preparing or converting the sheets into container or can parts.

In such a feeding and gauging mechanism the sheets A are advanced continuously along a horizontal straight line path of travel by a pair of spaced and parallel endless chain conveyors 11 (Figs. 1, 2 and 3) having feed dogs 12 secured thereto at spaced intervals along their lengths for engaging the back or rear transverse edges of the sheets. During this travel the sheets are supported on a pair of longitudinal support bars 13 which are disposed adjacent the path of travel of the conveyors 11. These support bars 13 are secured to a bracket 14 which extends up from a frame 15 which constitutes the main frame of the machine.

The upper runs of the chain conveyors 11 are supported on longitudinal tracks 16 which are secured to the bracket 14. The chains operate over idler sprockets 17 which are mounted in spaced relation on an idler shaft 18 journaled in bearings 19 formed in the bracket 14. These chains are continuously operated in any suitable manner.

The chain conveyors 11 are utilized to feed a sheet A to a place or station immediately adjacent the subsequent operation or treating machine and at this station and while the sheet is continuously moving forward, it is gauged for proper location and alignment and is immediately advanced into the treating machine while so gauged. In gauging the sheet it is shifted away from and clear of the conveyor feed dogs 12 and is brought into a squared up position relative to the rear or feeding edge of the sheet before advancing into the treating machine. Suitable side guides 21 secured to upright side brackets 22 mounted on the machine frame 15, guide the sheet longitudinally of the machine. If desired these side guides may be made movable in any well known manner to travel with the sheets.

Squaring of the sheets A along their back or feeding edges is brought about by a pair of rotary squaring up or back gauges 25 disposed in the path of travel of the sheets. Each back gauge includes a gauge arm 26 (Fig. 2) having on its outer or free end a gauging head 27 for engagement with the back or feeding edge of the sheet A to be gauged. The gauge head 27 preferably is adjustable relative to the gauge arm 26 for accurately setting the head in a position for squaring up the back edge of the sheet when both heads engage this edge. This adjustment is made by a manually operable adjusting screw 28 retained in the gauge arm 26 and threadedly secured in the head 27. A lock bolt 29 which extends through the head and is secured in the arm is provided for locking the head in position after an adjustment.

The two back gauge arms 26 are mounted in spaced relation adjacent the conveyors 11, on a continuously rotating gauge or cross shaft 31 which is journaled adjacent its outer ends in bearings 32 formed in side brackets 33 carried on and extending up from the machine frame 15. The brackets are secured in place by T bolts 34 which engage in T slots 35 formed in the frame 15. This permits of shifting the brackets and the gauges 25 carried thereon for adjusting the gauges to sheets of different lengths. The gauge shaft 31 is rotated continuously in time with and slightly faster than the lineal travel of the conveyors 11 in a manner which will be hereinafter explained, and thus rotates the gauge arms 26 and their gauge heads 27 through circular paths of travel concentric with the shaft.

The back gauges 25 rotate through one revolution for each sheet A and bring their gauge heads 27 up behind a sheet to be gauged just as the conveyor feed dogs 12 bring the back edge of the sheet adjacent the gauges. As the gauge heads contact the back edge of the sheet they square up this edge against both of the heads and move the sheet away from the feed dogs as hereinbefore explained. This squaring of the sheet is effected rapidly while the sheet is traveling forward over a short distance. In moving the gauged sheet away from the feed dogs 12, the back gauges 25 advance the sheet sufficiently to enter the forward or leading edge of the sheet into the treating machine.

As an example of a treating machine, the drawings illustrate a pair of continuously rotating rollers between which the leading edge of a gauged sheet is inserted and which constitute an upper or transfer or blanket cylinder 36 and a lower or impression cylinder 37 of a conventional printing press or coating machine. These cylinders are rotated in unison in any suitable manner at a peripheral speed of travel of the chain conveyors 11. The cylinders make one revolution for each sheet A. The upper or transfer cylinder 36 is mounted on a transverse shaft 39 which is journaled in bearings 41 formed in the upright brackets 22.

As in most machines of this type, the lower or impression cylinder 37 is mounted in such a manner that it may be shifted away from the upper cylinder 36 when no sheet A is fed for printing or coating. This prevents the transfer cylinder from engaging the impression cylinder and thus prevents transfer of ink or coating material to the impression cylinder. This is a usual safety feature. For this purpose the impression cylinder 37 is mounted on a cross shaft 44, the ends of which are journaled in a pair of normally stationary eccentric bushings 45 (see Figs. 5 and 6) which are rotatably mounted in bearings 46 formed in the upright brackets 22.

The eccentric bushings 45 are formed with actuating arms 47 which extend outwardly between the brackets 22. The outer ends of these arms are connected to links 48. These links are raised and lowered in any suitable manner such as by cam action as disclosed in United States Patent No. 1,070,610 issued August 19, 1913 to R. T. Johnston on Apparatus for Intaglio Printing, the rotation of the cam being effected through a no-sheet detector. This is a conventional feature and forms no part of the instant invention, it being sufficient to state that when no sheet is present on the chain conveyors 11, the links 48 rotate the eccentric bushings 45 and thus lower or separate the impression cylinder 37 from the transfer cylinder 36 for one revolution of these cylinders.

The lower or impression cylinder 37 is equipped with a set of gripper fingers 51 (Figs. 1 and 6) which clamp the leading edge of a gauged sheet A against the outer periphery of the impression cylinder and thus hold it in gauged position until it is firmly held between the transfer cylinder and the impression cylinder for advancement therebetween for the printing or coating operation. These gripper fingers 51 are located in a recess 52 which extends transversely of the impression cylinder. The fingers are mounted on a rocker shaft 53, the ends of which are carried in end plates 54 secured to the ends of the impression cylinder. Intermediate its ends the rocker shaft carries a lever 56. The outer end of the lever is secured to a pin 57 which extends down into an aperture 58 formed in the cylinder. A compression spring 59 surrounding the pin and interposed between the lever and the cylinder holds the gripper fingers 51 in clamping position as shown in Fig. 6.

The fingers 51 are periodically opened by cam action to temporarily grip the sheet edge and then to release it. This is brought about by a lever 62 (Figs. 1, 2, 5 and 6) which is carried on one end of the rocker shaft 53 which projects beyond the adjacent impression cylinder end plate 54. The lever carries a cam roller 63 which operates on an edge cam 64 formed on the inner end of the adjacent eccentric bushing 45. Since the eccentric bushing is normally stationary, the cam remains stationary excepting when the bushing rotates. However, movement of the cam only takes place when no sheet is on the chain conveyors 11 and thus the shifting of the cam does not affect the proper operation of the gripper fingers.

Under normal operation of the machine, the cam 64 rocks the lever 62 and the rock shaft 53 just as the rotating impression cylinder 37 carries the gripper fingers 51 up to the top of the cylinder where they are disposed between this cylinder and the transfer cylinder 36. A clearance recess 66 (Fig. 6) is provided in the transfer cylinder 36 to permit the fingers to pass between the cylinders. This rocking of the rock shaft opens the gripper fingers. While the fingers are open, and as the impression cylinder continues to rotate, the leading edge of the gauged sheet A is introduced between the cylinders by the back gauges 25 as hereinbefore mentioned and moves into position between the gripper fingers 51 and the outer periphery of the impression cylinder. The fingers are made sufficiently long so that the leading edge of the gauged sheet does not engage the back of the fingers so that the sheet will not be shifted out of its gauged position. This clearance is just sufficient for sheets within the range that the back gauges 25 are set for and it is for this reason that in this type of gauging the setting of the back gauges bears a definite accurate space relation to the gripper fingers, which for best results must be maintained throughout the gauging and gripping operations.

As soon as the leading edge of the gauged sheet A is in position under the gripper fingers 51, the cam 64 permits the fingers to close on the sheet and thus clamp it against the impression cylinder 37. Continued rotation of this cylinder carries the sheet forward. When the clearance recess 66 in the transfer cylinder passes the impression cylinder, the outer surface of the transfer cylinder presses the sheet A against the impression cylinder and thus further advancement of the sheet between the cylinders is effected by the cylinders themselves. The gripper fingers 51 are thereupon opened and the leading edge of the sheet is released. Upon release this edge of the sheet springs up into a horizontal position and rides up onto a table 67 (Fig. 6) along which the sheet is advanced while being operated upon by the cylinders 36, 37.

In order to maintain perfect timing between the rotation of the back gauges 25 and the gripper fingers 51 so as to maintain the definite accurate spaced relation between these elements as hereinbefore mentioned, the back gauges 25 are driven directly from the impression cylinder 37, through a rigid connection which eliminates all lost motion. For this purpose the back gauge shaft 31 and the impression cylinder shaft 44 carry a pair of cranks 71 which are of the same length and which are secured to and rotate with the shafts at their outer ends. The cranks are disposed in parallelism and in a predetermined relation to the gauge heads 27 and the gripper fingers 51 as shown in Fig. 2. During the gauging operation the cranks preferably will be in the depending position shown in Fig. 2.

Each crank 71 carries a radially disposed slide 72 which is located in a recessed slideway 73 (Fig. 5) formed in the cranks. The slides are retained under pressure against the outer ends of the cranks by compression springs 74 (Fig. 2) which are located in blind bores 75 formed in the cranks adjacent the shafts on which they are mounted. These springs press against the inner ends of the slides. The outer ends of the slides are connected by a rigid connecting rod 76, the ends of which are mounted on pivot pins 77 secured in the slides 72.

Hence the back gauges 25 and the impression cylinder 37 are rotated in synchronism without any lost motion, since the connecting rod 76 provides a rigid connection between the two cranks 71. When the impression cylinder 37 is separated from the transfer cylinder 36 to prevent the transfer of ink or coating material to the impression cylinder when no sheet is passed between the cylinders, the normal distance between the back gauge shaft 31 and the impression cylinder shaft 44 is increased slightly and this is compensated for by the compression springs 74 and the slides 72 when the connecting rod 76 passes through its dead center position. It is for this purpose that the connecting rod is mounted on the spring backed slides 72.

The connecting rod 76 preferably is made adjustable to compensate for changing the position of the back gauges 25 for sheets A of different lengths as hereinbefore mentioned. For this purpose the connecting rod is made in two pieces or sections which are bolted together by bolts 81 (Fig. 2) which extend through elongated slots 82 formed in the rod sections. Thus by merely loosening the bolts 81, the length of the rod may be changed to correspond with a new setting of the back gauges 25 when the gauge brackets 33 are shifted for a different length of sheet A. After such an adjustment the bolts are tightened and the rod again becomes a rigid connection.

In changing the setting of the back gauges 25 for a sheet of a different length, the parallel relation of the cranks 71 is preserved so as to maintain the proper angular relation between the gauge heads 27 and the gripper fingers 51. This is brought about through the use of aligning arms 85, 86 (Figs. 1 and 2) formed respectively on the cranks 71 and the brackets 22 and 33. The aligning arms 85 move with the cranks 71 and adjacent their outer ends are formed with aligning holes 87. The cooperating aligning arms 86 on the brackets 22 and 33 are stationary and adjacent their outer ends are formed with aligning holes 88 (see Figs. 1, 2 and 4).

Hence before changing the position of the back gauge brackets 33, the aligning holes 87 in the two movable aligning arms 85 are brought into register with the aligning holes 88 in the two stationary aligning arms 86 and locking pins of substantially the same size as the holes are inserted into each aligning hole 87 and pushed through into the aligning holes 88. This locks the two movable arms 85 and their integral cranks 71, against movement from their relative positions. While the arms and cranks are thus locked, the back gauge brackets 33 may be adjusted as mentioned above without disturbing the angular relation or parallelism of the cranks or the time relation between the back gauges 25 and the gripper fingers 51. After such an adjustment, the locking pins are withdrawn from the aligning holes 87, 88 and the mechanism is ready for operation.

Provision is made for preventing the locking of the connecting rod 76 on its dead center during operation of the mechanism. This is brought about by an endless chain 91 (Figs. 1 and 4) which operates over sprockets 92, 93 mounted on the gauge shaft 31 and the impression cylinder shaft 44, respectively. These sprockets and chain are disposed outside the machine frame 15 on the side of the mechanism opposite the connecting rod 76.

Intermediate the sprockets 92, 93 the lower run of the chain operates over a pair of fixed and spaced idler sprockets 95 mounted on short shafts 96 journaled in bearings 97 (see also Fig. 3) formed in the machine frame 15. This lower run of the chain also operates under a vertically movable idler sprocket 98 disposed between the fixed idler sprockets 95 and mounted on a short shaft 99 carried in a vertically adjustable slide plate 101. The slide plate 101 is disposed in a slideway 102 formed in a vertical member 103 secured to the side of the machine frame 15. Gibs 104 hold the slide in place.

The function of the vertically movable idler sprocket 98 on the slide 101 is to take up any slack in the chain 91 and to hold the chain taut. After an adjustment of the back gauge brackets 33 for a sheet A, the slide 101 is shifted manually in its slideway 102 to cause the idler sprocket 98 to draw the chain 91 taut. The slide is then locked in this position by bolts 106 which extend through vertically elongated slots 107 in the gibs 104 and which are threadedly secured in the slide. Tightening of these bolts lock the slide against the gibs.

With the chain 91 thus maintained in a taut condition, it is driven by the sprocket 93 on the impression cylinder shaft 44. Hence when the connecting rod 76, in rotating the back gauges 25, moves into a dead center position, i. e. when it is in alignment with a center line extending through the centers of the gauge shaft 31 and the impression cylinder shaft 44, the driven chain 91 momentarily takes over the rotation of the gauges 25 and thus rotates the connecting rod past its dead center without any locking effect of the rod. This chain 91 is merely an auxiliary drive and is effective only when the connecting rod is passing its dead center or when starting the mechanism with the rod on dead center. This passage of the rod past its dead center takes place twice in each cycle of operation. One of these portions of the cycle is when the gauges 25 are rotating idly immediately after leaving a gauged sheet and the other portion is just prior to contacting the next following sheet for a gauging operation. Therefore the actual gauging of a sheet is effected during a period of the cycle of operation when the gauges are rotated solely by the connecting rod 76 so as to insure elimination of all lost motion.

It is in this manner that the back gauging of a sheet is effected under highly accurate conditions and in a predetermined relation to the gripper fingers 51 without relying upon the gripper fingers for any part in the gauging operation. The fingers merely receive and grip the gauged sheet and momentarily hold it in gauged position until the gauged sheet is engaged by the impression cylinder and the transfer cylinder for the printing or coating operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a sheet feeding and gauging mechanism, the combination of feeding means engageable with a sheet of material for advancing it along a path of travel, a gauge shaft located at right angles to said path of travel, a sheet gauging device mounted for rotation on said gauge shaft said sheet gauging device having a gauging element engageable against the back edge of said advancing sheet for shifting said sheet into a gauged position, a sheet advancing shaft disposed parallel to said gauge shaft, sheet advancing means mounted on said sheet advancing shaft and including gripper elements disposed in a predetermined spaced relation to said gauging element for receiving said gauged sheet and for further advancing it in its gauged position, a crank secured to said gauge shaft, a crank of equal length secured to said sheet advancing shaft, and a rigid connection between said cranks to connect said gauging device and said sheet advancing means for operating said device and said means in timed relation, said rigid connection maintaining said predetermined spaced relation between said gauging element and said gripper elements during the gauging and gripping of said sheet.

2. In a sheet feeding and gauging mechanism, the combination of feeding means engageable with a sheet of material for advancing it along a path of travel, a sheet gauging device having a rotatable gauging element rotating on a transverse axis and engageable against the back edge of said advancing sheet for shifting said sheet into a gauged position, rotatable advancing means having rotation on a transverse axis for receiving said gauged sheet and for further advancing it in its gauged position, and a rigid connecting rod connecting said gauging device with said sheet advancing means said connecting rod having connection with said gauging device at a predetermined distance from its axis and having connection with said advancing means at the same predetermined distance from the advancing means axis for operating said device and said means in timed relation without lost motion.

3. In a sheet feeding and gauging mechanism, the combination of a frame having a slideway, a support having engagement in a selected position upon said frame slideway, feeding means engageable with a sheet of material for advancing it along a path of travel over said frame, a sheet gauging device carried by said support and having a gauging element for engagement with the back edge of said advancing sheet for shifting the sheet into a gauged position, advancing means mounted in said frame for receiving said gauged sheet and for further advancing it in its gauged position, means carried by said support for locking the support on said frame at the desired distance from said advancing means to locate said gauging device for operation on a sheet of predetermined length, a rigid connecting rod interposed between said gauging device and said sheet advancing means for synchronizing operation of the gauging device and the advancing means, and means carried in said connecting rod for changing its length to correspond with the location of said gauging device for the feeding and gauging of the desired length of sheet.

4. In a sheet feeding and gauging mechanism, the combination of feeding means engageable with a sheet of material for advancing it along a path of travel, a rotatable sheet gauging device rotating on a transverse axis and engageable against the back edge of said advancing sheet for shifting said sheet into a gauged position, rotatable advancing means having rotation on a transverse axis spaced from and parallel with said gauging device axis for receiving said gauged sheet and for further advancing it in its gauged position, a rigid connecting rod connecting said gauging device with said sheet advancing means and operable by said advancing means the connecting ends of said rod transcribing circles around the respective axes for operating said device and said means in timed relation without lost motion, and auxiliary driving means operable by said advancing means and effective on said gauging device when the ends of said connecting rod are passing through a dead center position for insuring against locking of said connecting rod and for continuing the operation of said gauging device in time with said advancing means.

5. In a sheet feeding and gauging mechanism, the combination of feeding means engageable with a sheet of material for advancing it along a path of travel, a sheet gauging device engageable against the back edge of said advancing sheet for shifting said sheet into a gauged position, advancing means for receiving said gauged sheet and for further advancing it in its gauged position, said advancing means being movable relative to a normal path of travel of the sheet into an inoperative position under an abnormal sheet feeding condition, a rigid connecting rod connecting said gauging device with said sheet advancing means for operating said device and said means in timed relation without lost motion, and a yieldable mounting for at least one end of said connecting rod for compensating for a shifting of said advancing means into said inoperative position.

6. In a sheet feeding and gauging mechanism, the combination of feeding means engageable with a sheet of material for advancing it along a path of travel, a sheet gauging device having a rotatable gauging element engageable against the back edge of said advancing sheet for shifting said sheet into a gauged position, a driven crank on said gauging device for rotating said gauging element, rotatable advancing means for receiving said gauged sheet and for further advancing it in its gauged position, a driving crank mounted on said advancing means, said driving crank being equal in length to said driven crank and being disposed in parallelism therewith, and a rigid connecting rod connecting with the ends of said cranks and driven by said driving crank for rotating said gauging element and said advancing means in timed relation without lost motion.

7. In a sheet feeding and gauging mechanism, the combination of feeding means engageable with a sheet of material for advancing it along a path of travel, a sheet gauging device having a rotatable gauging element engageable against the back edge of said advancing sheet for shifting said sheet into a gauged position, a driven crank on said gauging device for rotating said gauging element, rotatable advancing means for receiving said gauged sheet and for further advancing it in its gauged position, a driving crank mounted on said advancing means, said driving crank being equal in length to said driven crank and being disposed in parallelism therewith, a slide yieldably mounted in each of said cranks, and a rigid connecting rod connecting with said slides and driven by said driving crank for rotating said gauging element and said advancing means in timed relation without lost motion.

8. In a sheet feeding and gauging mechanism, the combination of a frame, a driving shaft supported in said frame, a driven shaft disposed in spaced and parallel relation to said driving shaft, a support movably mounted on said frame for supporting said driven shaft, a sheet gauging element mounted on said driven shaft for rotation therewith and engageable against the back edge of a sheet of material for shifting said sheet into a gauged position, sheet advancing means mounted on said driving shaft for rotation therewith for receiving said gauged sheet and for advancing it in its gauged position, a pair of cranks of equal length mounted on said shafts and disposed in parallelism, a rigid connecting rod having its ends pivotally mounted on said cranks for rotating said driven shaft from and in time with said driving shaft without lost motion, said connecting rod being adjustable lengthwise for accommodating said rod to an adjusted position of the movable support of said driven shaft, and a pair of aligning arms carried on said shafts and lockable with said frame and said movable support for holding said shafts against rotation during adjustment of said movable support and said connecting rod.

9. In a sheet feeding and gauging mechanism, the combination of feeding means engageable with a sheet of material for advancing it along a path of travel, a sheet gauging device having a rotatable gauging element engageable against the back edge of said advancing sheet for shifting said sheet into a gauged position, rotatable advancing means for receiving said gauged sheet and for further advancing it in its gauged position, a movable support for said sheet gauging device, said support being movable toward and away from said advancing means for accommodating said gauging device to sheets of different lengths, a pair of cranks of equal length and disposed in parallelism and mounted one on said gauging device and one on said advancing means, an adjustable rigid connecting rod having its ends pivotally mounted on said cranks and operable by said advancing means for rotating said gauging element in time with said advancing means without lost motion, auxiliary chain driving means operable by said advancing means and effective on said gauging device when said connecting rod passes through a dead center position of said cranks for insuring against locking of said connecting rod during its cycle of operation, slack take-up means engageable with said auxiliary chain driving means and having movable members adjustable to take-up any slack in said auxiliary chain driving means, and means for locking said take-up means in an adjusted position.

10. In a sheet feeding and gauging mechanism, the combination of feeding means engageable with a sheet of material for advancing it along a path of travel, a sheet gauging device including a rotatable arm carrying a gauging element engageable against the back edge of said advancing sheet for shifting said sheet into a gauged position, a continuously rotatable transfer cylinder, a cooperating continuously rotatable impression cylinder, a plurality of gripper fingers located in said impression cylinder for receiving and gripping the leading edge of said gauged sheet for drawing said sheet into position between said cylinders for further advancement, said gripper fingers being disposed in a predetermined spaced relation to said gauging element for the accurate gauging and gripping of said sheet, and a rigid connecting rod and crank connection between said gauging device and said impression cylinder for continuously rotating said gauging element in time with said impression cylinder without lost motion, said connecting rod and cranks maintaining said predetermined spaced relation between said gauging element and said gripper fingers during the gauging and gripping of said sheet.

WILLIAM PECHY.

REFERENCES CITED

The following references are of record in the file of this patent:

UNITED STATES PATENTS

| Number | Name | Date |
|---|---|---|
| 1,030,183 | Inman | June 18, 1912 |
| 1,895,080 | MacArthur | Jan. 24, 1933 |
| 2,200,409 | Backhouse | May 14, 1940 |
| 2,273,823 | Ayres | Feb. 24, 1942 |